Figure 1:
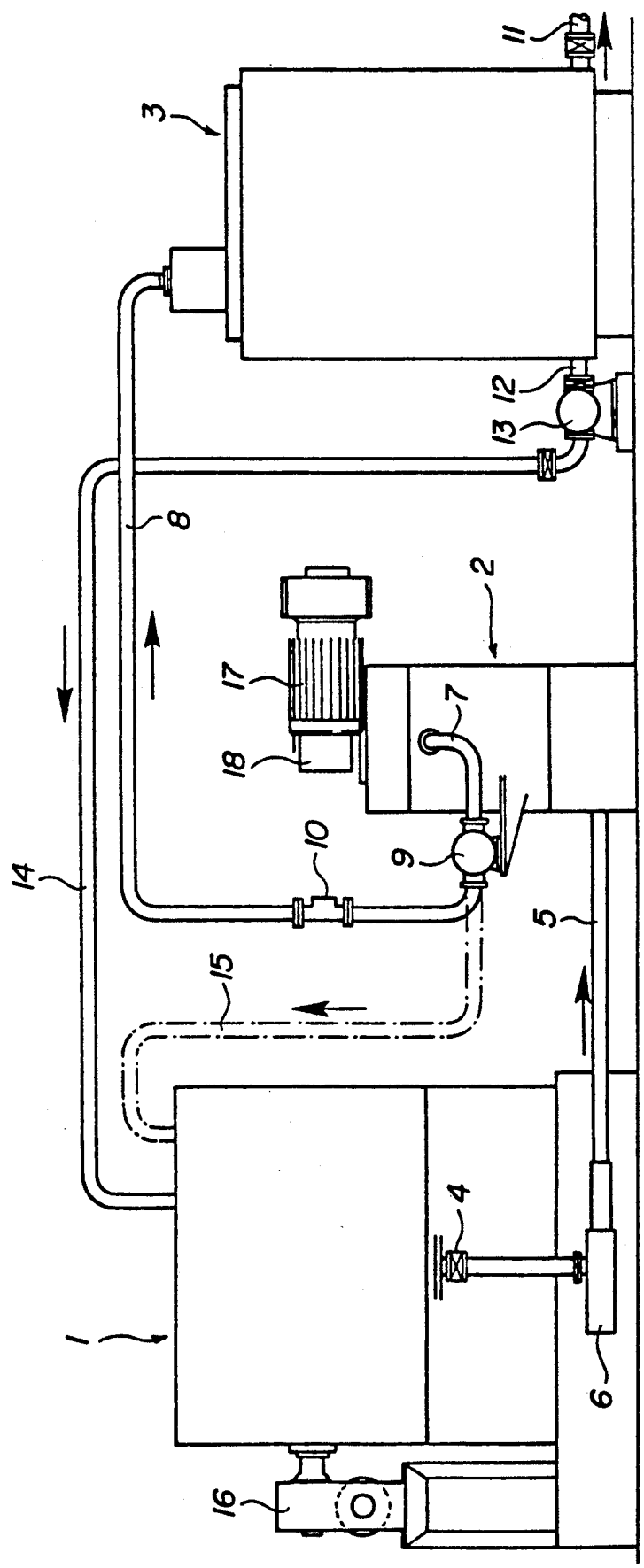

United States Patent [19]

Chauveau

[11] Patent Number: 5,197,680
[45] Date of Patent: Mar. 30, 1993

[54] BALL MILL FOR THE MANUFACTURE OF GOODS FORMED BY THE SUSPENSION OF SOLID PARTICLES IN A FATTY CARRIER

[75] Inventor: Jean-Marie Chauveau, Gorgier, Switzerland

[73] Assignee: Servco S.p.A., Italy

[21] Appl. No.: 656,147

[22] PCT Filed: Jul. 19, 1990

[86] PCT No.: PCT/CH90/00176
§ 371 Date: Mar. 25, 1991
§ 102(e) Date: Mar. 25, 1991

[87] PCT Pub. No.: WO91/01648
PCT Pub. Date: Feb. 21, 1991

[30] Foreign Application Priority Data

Jul. 26, 1989 [FR] France .......................... 89 10278

[51] Int. Cl.$^5$ ............................................. B02C 17/16
[52] U.S. Cl. ........................................ 241/57; 241/172
[58] Field of Search .................................. 241/57, 172

[56] References Cited

U.S. PATENT DOCUMENTS

| | | | |
|---|---|---|---|
| 1,956,293 | 4/1934 | Klein et al. ............... | 241/172 X |
| 3,927,838 | 12/1975 | Soloviev et al. ........... | 241/172 X |
| 4,673,134 | 6/1987 | Barthelmess ............... | 241/57 |
| 4,713,256 | 12/1987 | Chaveron et al. . | |
| 4,811,909 | 3/1989 | Inoki ..................... | 241/57 X |

FOREIGN PATENT DOCUMENTS

| | | |
|---|---|---|
| 0180976 | 5/1986 | European Pat. Off. . |
| 1214982 | 4/1966 | Fed. Rep. of Germany . |
| 2030618 | 11/1970 | France . |
| 594294 | 2/1978 | U.S.S.R. ............... 241/172 |
| 673617 | 6/1952 | United Kingdom . |
| 8505012 | 11/1985 | World Int. Prop. O. . |

Primary Examiner—Timothy V. Eley
Assistant Examiner—Frances Chin
Attorney, Agent, or Firm—Davis, Bujold & Streck

[57] ABSTRACT

A ball mill for the manufacture of goods such as chocolate, formed by the suspension of solid particles in a fatty carrier. The ball mill is arranged so as to execute different processing operations at the same time in order to achieve high productivity and goods of high quality with limited capital goods investment. The ball mill (2) includes a rotating shaft (34) containing a central conduit (38) and having arms provided with fluid-distributing conduits (39) and openings (40). The goods are processed by injecting fluid into the mass as the solid suspended particles are crushed. In the case of chocolate, sterilized air, a neutral gas or lecithin can for example be injected. The ball mill can be utilized in the manufacture of food goods, inks or paints.

6 Claims, 2 Drawing Sheets

BALL MILL FOR THE MANUFACTURE OF GOODS FORMED BY THE SUSPENSION OF SOLID PARTICLES IN A FATTY CARRIER

The present invention concerns a ball mill for the manufacture of a product formed of a paste or liquid suspension of solid particles in a fat vehicle, particularly for the manufacture of food products, the ball mill comprising a vat disposed to hold the unattached crushing means (crushing balls) and a mixture of solid particles and of at least one fat substance in liquid or paste form, the vat being provided with an inlet opening and an outlet opening for said mixture, a rotating shaft extending inside the vat and having agitating elements to set the crushing balls in motion under the influence of rotation of the shaft, drive means to turn the shaft, and means for introducing at least one fluid inside the vat.

Generally speaking, the manufacturing techniques for chocolate and similar products, such as chocolate substitutes, chocolate covered products, creams, or spreadable hazelnut or almond paste, etc. entail operations requiring much time and energy and require a large investment in machinery. In the case of chocolate, after mixing the principal ingredients consisting of powdered or crystallized sugar, powdered whole milk, cocoa paste or cocoa powder as well as cocoa butter, it is first necessary to obtain a thorough mixture of the solid components, particularly the cocoa particles, with the liquid or paste components, and then to further refine the product by crushing the solid particles. The cocoa particles then become a kind of flake with a broad specific surface allowing the product to be fairly easily plasticized, thanks to the fat content of the paste.

With the conventional technique, this manufacturing phase takes place first in cylinder calenders, then in vats called "conches" where the paste is kneaded while exposed to heat or air for periods of the order of from 24 to 48 hours. It is well established that this "conching" step improves product quality considerably, not only because of its mechanical effects, but also due to the oxidation of certain components on air contact and further by improving aromatic quality due to the total or partial elimination of certain volatile components, specifically aldehydes and ketones. These effects of oxidation during exposure to air are described in greater detail by H. FINCKE in "HANDBUCH DER KAKAOERZEUGNISSE", page 225, 2nd edition, Springer-Verlag, Berlin, 1985, However, traditional "conching" requires cumbersome equipment with low productivity and consumes a great deal of energy.

To achieve a result equivalent to "conching" with a smaller investment, a recent technique consists of continuously pumping the mixture from a mixer to one or more ball mills, which reduce the particles to a size of about 20 μm and simultaneously homogenize the mass. Then the liquid chocolate coming from the ball mill or ball mills is exposed to the action of the oxygen in the air by means of apparatus which form it into thin layers, for example, as described in publication WO 85/05012, (now U.S. Pat. No. 4,746,529), with a simultaneous injection of air on or through the thin layer of chocolate. To be highly effective, however, such a treatment must continue for a fairly long time because it is difficult for the oxygen to reach the surfaces of the solid cocoa particles, as they are covered with a thin film of the fat substance. That is why this newer technique has not yet been used in the manufacture of high quality chocolates. Furthermore, it also requires a considerable amount of equipment.

With a view toward reducing material costs, publication DE-B-1 214 982 proposes using a ball mill of the type indicated in the preamble and injecting hot air through the base of the vat during crushing for aerating the chocolate or injecting pure oxygen to ensure the desired degree of oxidation. This system seems to lack effectiveness and is not widely used.

Therefore, the object of the present invention is to create a highly productive apparatus for the manufacture of products of the type indicated above requiring a smaller investment than present techniques, while at the same time providing treatment effective enough to produce superior quality chocolate.

The ball mill according to the invention is characterized in that the said means for introducing liquid comprises distribution orifices disposed in at least certain of the agitating elements, an inlet conduit disposed in the rotating shaft, and distribution conduits connecting the inlet conduit to the distribution conduits, said agitating elements with distribution orifices being immersed in the said mixture so as to distribute the said fluid in the areas where the crushing balls are in motion due to the action of the agitating elements during rotation of the shaft.

The means for fluid introduction may comprise an air blowing device connected to the said inlet conduit. The air blowing device may include an air sterilization means. The means for fluid introduction may also comprise a liquid source and a dispenser connected to said source and to the inlet conduit.

In a preferred embodiment, the rotating shaft is vertical and has near its upper extremity a rotatable connector connecting the said inlet conduit to at least two stationary inlets respectively connected to a gas source and to a liquid source.

Preferably, the agitating elements with distribution orifices are radial arms spaced along the rotating shaft at measured intervals.

Figure 2:
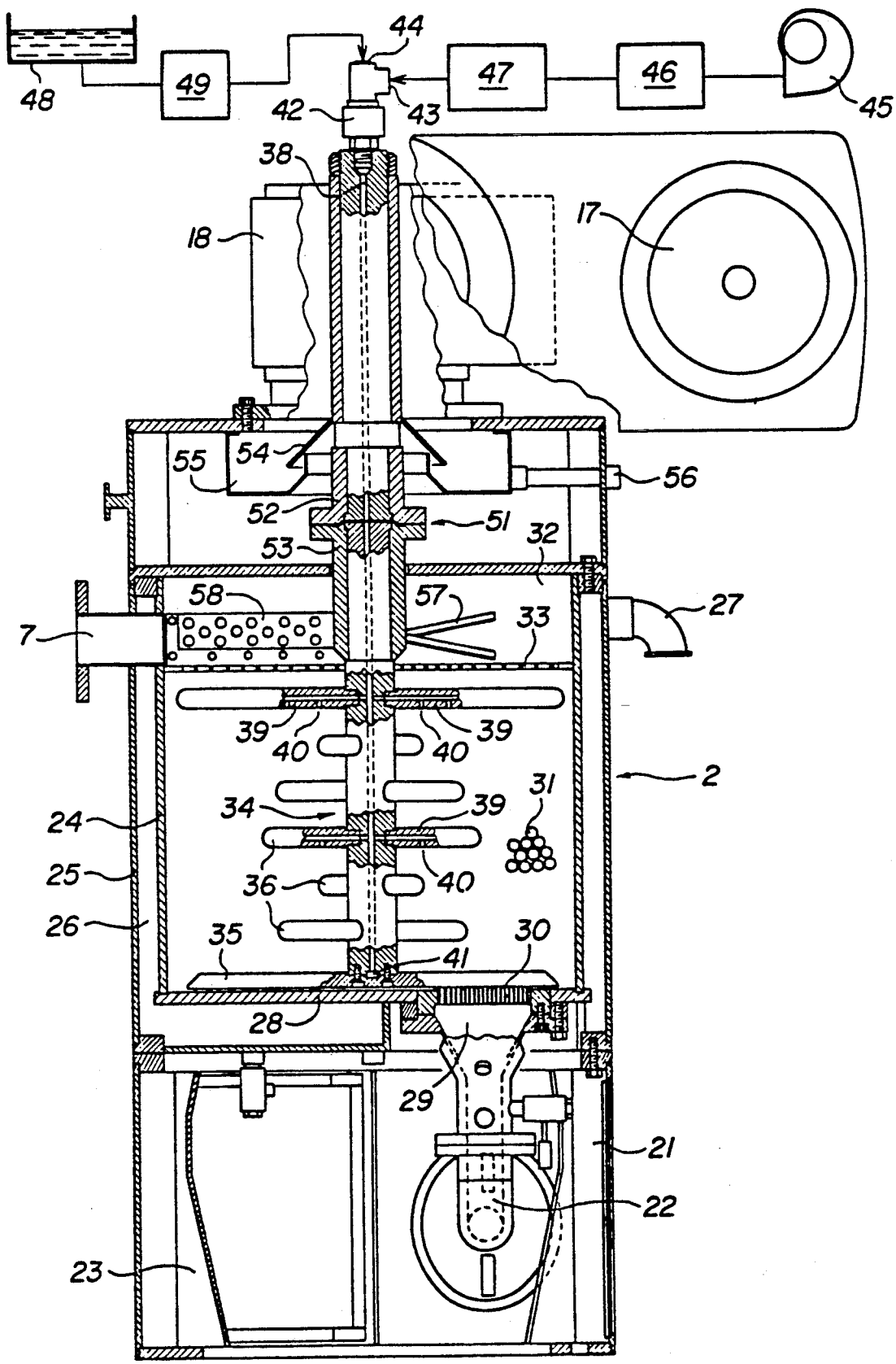

The present invention will be better understood with the help of the following description of one form of embodiment, presented by way of non-limiting example, and with reference to the attached drawings, in which:

FIG. 1 is a schematic elevational view of the principal machinery in a chocolate manufacturing installation using a ball mill according to the present invention; and FIG. 2 is a vertical cross-section of the said ball mill.

The unit shown in FIG. 1 is designed for manufacturing food products in the form of solid particles suspended in a fat vehicle. The example described here refers to the manufacture of chocolate, that is, the solid particles consist primarily of particles of cocoa and sugar, while the major portion of the fat vehicle consists of cocoa butter. However, the same unit may be used for making other products. It comprises three principal units, among which the treated product, in liquid or paste form, is transferred by pumps and conduits, more specifically a mixer 1, a ball mill or ball bearing crusher 2 and a conditioning and storage reservoir 3. The product can circulate from one unit to the other in the direction indicated by the arrows in the drawing. An outlet valve 4 on the mixer 1 is connected to an inlet of ball mill 2 by a conduit 5 with an adjustable flow pump 6. An outlet 7 on the ball mill 2 is connected to reservoir 3 by a conduit 8 having a pump 9 and a liquefying apparatus 10. Reservoir 3 comprises a first outlet 11 through which its contents may be evacuated for use, for example, onto a line for kneading and conditioning. A second outlet 12 on this reservoir is connected to a pump 13 and to a return conduit 14 for product recycling, either in stages or continuously, into mixer 1. Depending upon need, a return conduit 15 may also be included for sending the product back from ball mill 2 to mixer 1, for example, from a distribution valve (not shown) placed downstream of pump 9. Note also in the drawing a drive mechanism 16 for mixer 1, as well as the large electric motor 17 activating the vertical shaft of ball mill 2 through the intermediary of reduction gear 18. On the other hand, many other well known accessory devices are not shown, particularly the supply and dispenser means associated with mixer 1 and possibly with reservoir 3, as well as heating and/or cooling devices for the various units, for example, using hot or cold water circulators. The construction and functioning of ball mill 2 will be described later in more detail. Depending upon need, in a more complete unit the sole ball mill could be replaced by two or three ball mills connected in series with crushing balls of progressively smaller caliber to obtain increasingly finer crushing. These ball mills may function continuously.

To make a chocolate paste, the unit is used as follows. The ingredients are introduced into mixer 1 in measured quantities according to the recipe, specifically powdered or crystallized sugar, powdered whole milk, cocoa paste and/or cocoa powder, cocoa butter. The usual additives may be included with these principal ingredients, such as soy lecithin and aromatics such as vanilla. Mixer 1 processes this batch by agitation under heat until it has become a homogeneous mixture consisting of a suspension of solid particles of cocoa, sugar and powdered milk in a liquid fat containing very little humidity. This mixture may be transferred into ball mill 2 by pump 6 as an entire batch, a partial batch, or continuously, according to the mode of treatment adopted. Continuous functioning is preferred in larger installations.

In mixer 2, which will be described hereinafter, the mixture simultaneously undergoes the treatment of crushing the solid particles and aeration of the mass. If necessary, the mixture may be recycled into mixer 1 through return conduit 15, either in small quantities or continuously, until the desired degree of fineness is obtained, generally corresponding to solid particle dimensions of about 20 μm.

The product leaving ball mill 2 is sent by pump 9 toward reservoir 3, passing through liquefying apparatus 10 which improves its rheological characteristics by application of shearing forces with known mechanical means. In reservoir 3 the final treatment designed to improve taste may be applied to the product to refine its aromatic qualities in the conventional manner, for example, by forced ventilation with sterile, conditioned air, as well as by the addition of aromatics and technological additives such as preservative and thickening agents, etc.

FIG. 2 shows the ball mill or ball bearing crusher 2 according to the invention in greater detail. The general structure of this ball mill corresponds to the conventional type of ball bearing crusher and comprises a base structure 21 having an inlet conduit 22 connected to conduit 5, as well as a drainage reservoir 23 from the heating circuit. On this base structure there is mounted a cylindrical vat 24 designed to receive the product for treatment and surrounded by an exterior wall 25 forming an envelope of water 26 around it, connected by a conduit 27 to a thermostatically controlled heating and/or cooling circuit so as to maintain vat 24 and its contents at a predetermined temperature. Vat 24 has a base 28 with an inlet opening 29 connected to conduit 22 and having a screen 30 for introducing the product to be treated into the vat. The vat also contains the crushing balls such as metallic balls 31 of a caliber appropriate for the desired degree of crushing. An upper zone 32 of the inside of the vat is defined by a screen 33 through which the treated product proceeding from exit 7 of the ball mill may penetrate, but not the balls 31. The contents of vat 24, mixed with the balls, are agitated by rotation of a vertical shaft 34 driven by motor 17 and reduction gear 18. This shaft has agitating devices attached to it consisting of adjacent scrapers 35 at the vat base and of radial arms 36 spaced out along the shaft as far as the area of upper grill 33. Arms 36 preferably extend radially and are disposed so as to clean off essentially all the area occupied by the product being treated. The exterior shape of their transverse section may be freely selected so as to produce the desired movement of balls 31. In known manner, the movement of balls 31 has the effect of crushing the solid particles in suspension.

An original feature of ball mill 2 is the fact that it has means for distributing a gas and/or a liquid directly into the mass of product undergoing crushing. To do this, shaft 34 comprises an axial inlet conduit 38 extending along its entire length and connected to distribution conduits 39 disposed in arms 36 and opening onto the surface of these arms with several distribution orifices 40. These orifices may have various orientations on the various arms so as to ensure that fluid dispersion throughout the mass is as complete as possible. The lower extremity of inlet conduit 38 is stopped by a screw stopper 41, while at the upper extremity of the shaft this conduit has a rotatable fitting 42 with two stationary inlets 43 and 44. Inlet 43 is connected to a device blowing conditioned sterilized air, consisting for example of a blower 45, a filter 46 and a sterilizer 47 delivering sterile air at a predetermined temperature. Inlet 44 is designed for the introduction of liquid additives. In this example, they consist of soy lecithin, held in a reservoir 48 and delivered on command by microdispenser device 49.

Apart from the presence of conduits 38 and 39 and the rotatable fitting 42, rotating shaft 34 may be constructed in any manner known for this type of ball mill. In this example, it comprises a longitudinal joint 51 made with exterior cylindrical couplings 52, 53 facilitating maintenance. Above this joint, the shaft has a conical deflector 54 which sends any streams of oil possibly coming from reduction gear 18 into an annular groove 55 and an evacuation device 56 so they do not reach the product. In the upper portion 32 of the vat, the shaft also has agitation elements 57 and a scraper 58 ensuring regular evacuation of the product toward outlet 7.

Because of this construction, ball mill 2 generally allows a complementary treatment to take place, that of injecting a gas or a liquid into the product mass simultaneously with crushing. In the present example, a particularly advantageous feature of the chocolate manufacturing process resides precisely in the possibility of treating the mixture with continuous ventilation, at the same time and place that the crushing creates new free surfaces on the particles of cocoa, sugar and powdered milk. In this way the oxygen in the injected air can produce the desired oxidation on the cocoa much more quickly than in prior art installations, and moreover without requiring the special apparatus mentioned above designed for forming the chocolate into a thin layer for aeration. The air introduced into ball mill 2 may easily be sterilized, so that the entire treatment is effected in a controlled atmosphere inside the ball mill. In certain cases, ventilation of the chocolate in ball mill 2 will be sufficient. In other cases, secondary ventilation will be provided by simple means inside reservoir 3. Instead of treatment by ventilation or in addition to it, conduits 38 and 39 are particularly useful for injecting lecithin from reservoir 48 into the product during the course of crushing so as to correct its viscosity, which is modified by the progressive augmentation of the specific surface of the solid particles. This immediate correction is very effective because it takes place at the same place and at the same time that viscosity is being modified by the crushing, throughout the entire mass at once, and may be easily controlled by surveillance of the power required by motor 17. Obviously, it would also be possible to inject other liquids facilitating treatment, for example, a tensio-active liquid.

The present invention is not limited to the exemplary embodiment and the application described above. In particular, it should be noted that a crusher such as ball mill 2 has applications not only to the manufacture of chocolate and other analogous food products, but to any other product in the general form of a paste or liquid suspension of solid particles in a fat vehicle when these solid particles must undergo crushing. One example of such an application is the manufacture of printing inks or certain paints. Obviously the nature and quality of the materials constituting the various components of the ball mill would be chosen as a function of the products to be treated and of the evolution of techniques in the domain of the application concerned.

Furthermore, the ventilation treatment operating at the same time as crushing does not always have oxidation as its goal. On the contrary, the mass may be ventilated by means of another gas devoid of oxygen, particularly by means of nitrogen for the purpose of dehumidifying it while avoiding oxidation which would be considered harmful, for example when preparing a hazelnut based spreadable paste.

I claim:

1. A ball mill for the manufacture of a product formed from one of a paste and a liquid suspension of solid particles in a fat vehicle, said ball mill comprising:
   a vat (24) supporting unattached and freely movable crushing means (31) therein for crushing the suspended solid particles, said ball mill being appropriately sized to contain a suitable quantity of a mixture formed from one of a paste and a liquid suspension of solid particles in a fat vehicle and being provided with a mixture inlet (29) and a mixture outlet (7);
   a rotating shaft (34) extending inside said vat and supporting agitating elements (36) positioned to activate said crushing means during rotation of said rotating shaft (34);
   drive means for driving said rotating shaft; and
   means (38-48) for introducing fluid into said vat (24);
   wherein said means for introducing fluid comprises an air blowing device (45-47), for introducing pressurized air, communicating with an inlet conduit (38) located within said rotating shaft, at least one distribution orifice (40) formed in at least one of the agitating elements (36), and a distribution conduit (39) interconnecting said at least one distribution orifice with said inlet conduit (38); during use, said agitating elements (36) and said at least one distribution orifice are immersed in the mixture so as to distribute the fluid into areas where said crushing means (31) are set in motion by said agitating elements upon rotation of said rotating shaft;
   said means for introducing fluid further comprises at least one reservoir (48) containing a liquid to be dispensed into the mixture and dispenser means (49) interconnecting said reservoir with said inlet conduit (38) for dispensing the liquid; and
   said air blowing device (45-47) further comprises means (47) for sterilizing the air.

2. A ball mill according to claim 1, wherein said rotating shaft (34) is positioned substantially vertically and comprises, near an upper vertically portion thereof, a rotatable fitting (42) connecting said inlet conduit (38) with at least two stationary inlets (43, 44), a first of said at least two stationary inlets (43) is connected to said air blowing device (45-47) and a second of said at least two stationary inlets (44) is connected to said reservoir (48).

3. A ball mill according to claim 1, wherein a plurality of distribution orifices (40) are disposed within said agitating elements (36) and a plurality of distribution conduits (39) interconnect said plurality of distribution orifices with said inlet conduit (38), and said agitating elements (36) are radial extending arms disposed along said rotating shaft at a desired interval spacing.

4. A ball mill for the manufactures of a product formed from one of a paste and a liquid suspension of solid particles in a fat vehicle, said ball mill comprising:
   a vat (24) supporting unattached and freely movable crushing means (31) therein for crushing the suspended solid particles, said ball mill being appropriately sized to contain a suitable quantity of a mixture formed from one of a paste and a liquid suspension of solid particles in a fat vehicle and being provided with a mixture inlet (29) and a mixture outlet (7);
   a rotating shaft (34) extending inside said vat and supporting agitating elements (36) positioned to activate said crushing means during rotation of said rotating shaft (34);
   drive means for driving said rotating shaft; and
   means (38-48) for introducing at least one fluid into said vat (24);
   wherein said means for introducing at least one fluid comprises at least one of an air blowing device (45-47) for introducing pressurized air into the mixture and a reservoir (48) containing a liquid to be dispensed into the mixture by dispenser means (49);
   said means for introducing at least one fluid communicates with an inlet conduit (38) located within said rotating shaft, at least one distribution orifice (40) formed in at least one of the agitating elements (36), and a distribution conduit (39) interconnects said at least one distribution orifice with said inlet conduit (38); during use, said agitating elements (36) and said at least one distribution orifice are immersed in the mixture so as to distribute the at least one fluid into areas where said crushing means (31) are set in motion by said agitating elements upon rotation of said rotating shaft.

5. A ball mill according to claim 4, wherein said air blowing device (45-47) is present and further comprises means (47) for sterilizing the air.

6. A ball mill according to claim 4, wherein said dispenser means (49) is present and interconnecting said reservoir with said inlet conduit (38) for dispensing the liquid.

* * * * *